Nov. 18, 1969  W. B. HULLHORST  3,479,239
METHOD AND APPARATUS FOR PRODUCING TUBULAR FIBROUS BODIES
Filed Nov. 24, 1965  3 Sheets-Sheet 1

INVENTOR.
WILLIAM B. HULLHORST
BY
Staelin & Overman
ATTORNEYS

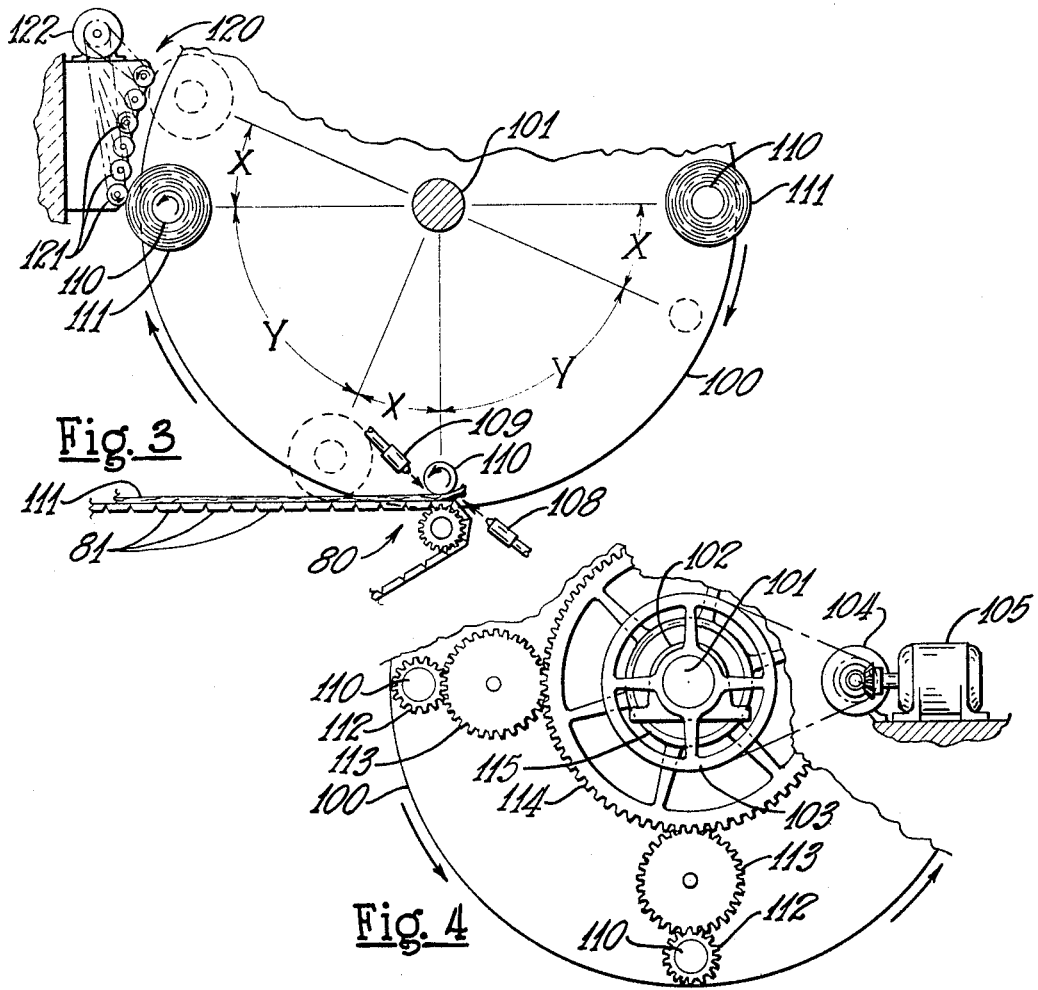

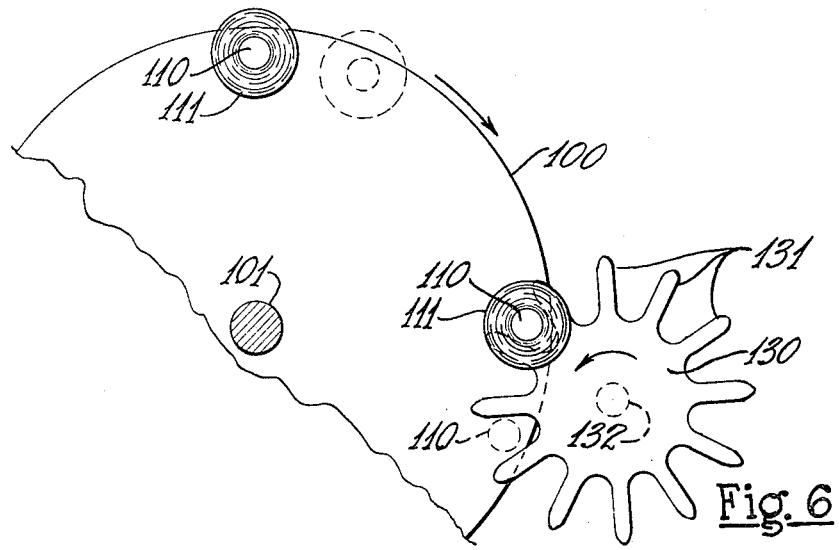
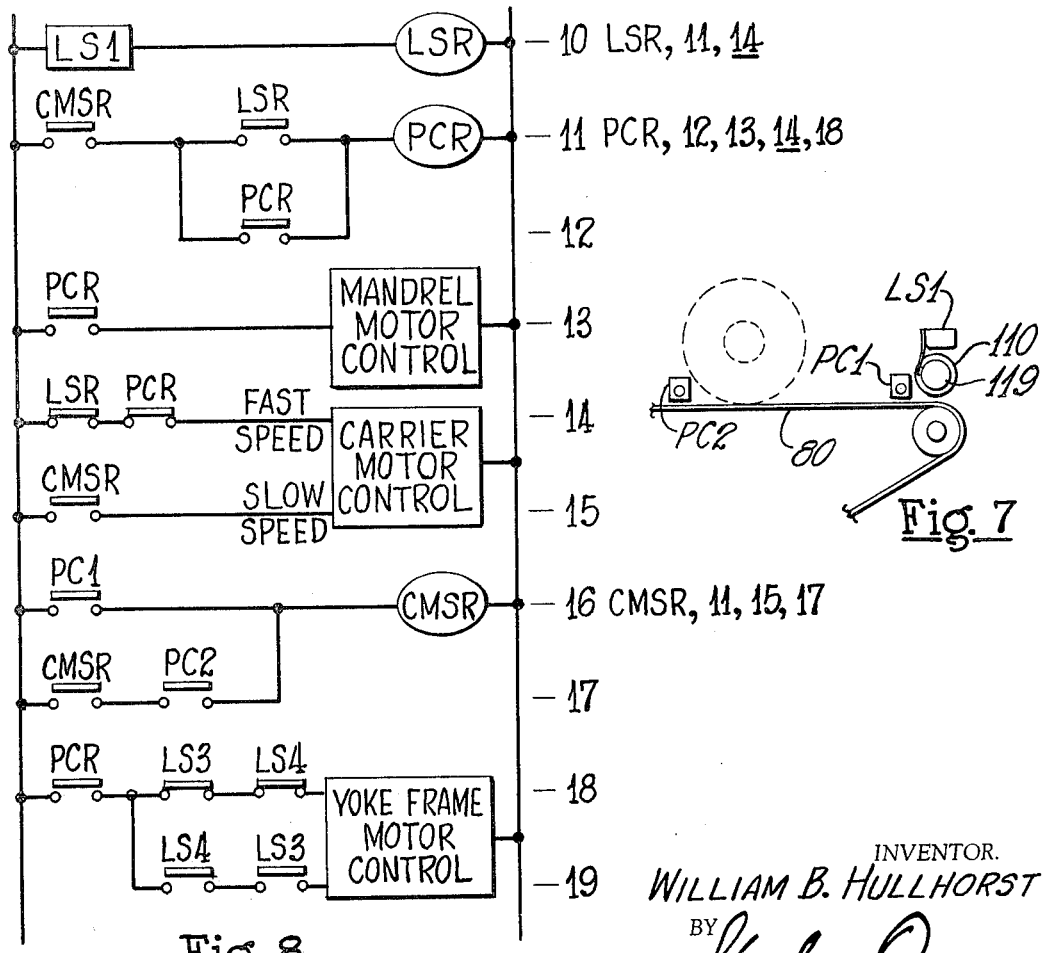

United States Patent Office 3,479,239
Patented Nov. 18, 1969

3,479,239
METHOD AND APPARATUS FOR PRODUCING TUBULAR FIBROUS BODIES
William B. Hullhorst, Granville, Ohio, assignor to Owens-Corning Fiberglas Corporation, a corporation of Delaware
Filed Nov. 24, 1965, Ser. No. 509,575
Int. Cl. B29d 23/01; B32b 1/08
U.S. Cl. 156—184                          13 Claims

ABSTRACT OF THE DISCLOSURE

A preferred embodiment of the method and apparatus is described herein in which the cure of a binder in a pelt is initiated before the pelt is wrapped on a mandrel. The resultant tubular body is provided with a high density inner surface, low density intermediate wraps for high insulating values, and a high density outer surface. The body is rotated with respect to the mandrel before the binder cure is completed to free the body for stripping from the mandrel.

---

This invention relates generally to tubular fibrous bodies designed primarily to serve as independent ducts and thermal insulating covers but also of utility for a variety of other purposes. The invention pertains particularly to ducts and insulation of fibrous glass, and apparatus and methods for continuous fabrication of such products from a conventional pack or mass of fibrous glass created by gathering and felting the fibers attenuated from molten threads in a standard fibrous glass forming operation.

The excellent performance of fibrous glass masses as thermal insulating media is widely recognized. Not only highly resistant to heat transfer, fibrous glass also has exceptional strength, and is chemically inert, so able to withstand exposure to the corrosive action of moisture, mildew, insects and other destructive elements.

Previously, it has been the usual practice to build tubular members of fibrous stock in stationary matrices or molds. This is not only a time consuming, costly procedure but with such an arrangement there is also the objectionable irregular production movement which necessitates extra handling and intermittent storage. Further there has been problems with obtaining a high percentage of products having a uniform density at the inner and outer surfaces thereof while having a lower density in the intermediate area to raise the insulating value.

Accordingly, it is an object of this invention to provide an effective, continuous process and comparatively simple and inexpensive apparatus for fabricating tubular bodies of fibrous glass.

Another object of this invention also resides in the production of a fibrous tube of uniform characteristics including desired density and inherent strength to withstand the stresses incurred in handling, transportation and installation.

Another object resides in the provision of a process adapted to receive and directly utilize a pack, mass, or mat of fibrous glass as delivered from a conventional fibrous glass forming station.

An additional object is to provide a tubular product with selected areas of greater density and strength and a method of creating such product.

The above objects and others are met by following the method disclosed herein for producing a tubular body of fibrous material which comprises the steps of forming and collecting a length of a mass of fibers on a conveyor means as it moves past a forming station, introducing a heat settable binder into the mass in an aqueous solution, allowing the aqueous solution to migrate throughout the mass to evenly distribute the binder in the mass, drying the mass to remove the aqueous solution therefrom while leaving the distributed binder in the mass, forming a plurality of pelts from the length each having feathered leading and trailing edges by parting the length transversely at predetermined intervals by the application of axially applied tension, initiating a cure of the binder in a pelt, compacting the pelt, rotating a mandrel to roll the pelt thereon by the wiping action of the fibers in the feathered leading edge, winding the entire pelt on the mandrel to form a tubular fibrous body, rotating the body with respect to the mandrel before completion of cure of the binder, completing the cure of the binder, and stripping the body from the mandrel.

Additional steps of the method may advantageously include compacting the pelt on the mandrel as the pelt is being wound on the mandrel, aiding the start of the feathered leading edge of the pelt on the rotating mandrel by directing an air blast to wrap fibers of the leading edge around the mandrel, and directing an air blast to tuck the leading edge of the pelt under the next successive wrap of the pelt as it winds around the mandrel. The step of compacting the pelt on the mandrel may best be carried out by maintaining the distance between the mandrel and a compacting means at an amount less than the thickness of the pelt on the mandrel. Advantageously the means for conveying the pelt to the mandrel, such as a hard surface conveyor, may be utilized as the compacting means. The step of increasing the distance between the mandrel and the compacting means as the pelt winds on the mandrel may be utilized to obtain a lower density intermediate the inner and outer surfaces of the tubular body. The distance between the mandrel and the compacting means may be maintained at a predetermined limit as the last of the pelt winds onto the mandrel to form a higher density outer surface on the tubular body.

Apparatus for carrying out the above method may include means for accomplishing each of steps enumerated. There may be further included means for carrying a plurality of the mandrels and means for indexing a second mandrel in a position to receive a second pelt after a first pelt is completely wound on the first mandrel.

Other objects, advantages and features of this invention will become apparent when the following description is taken in conjunction with the accompanying drawings in which;

FIGURE 3 is an enlarged view of the mandrel carrier apparatus illustrated in FIGURE 2;

FIGURE 4 is a rear elevational view of the apparatus illustrated in FIGURE 3;

FIGURE 5 is a plan sectional view of the apparatus illustrated in FIGURE 4;

FIGURE 6 is an enlarged view of the stripping means illustrated in FIGURE 2; and FIGURES 7 and 8 are schematic and diagrammatic illustrations of control means utilized in a preferred embodiment of this invention.

Glass fibers may be produced by a number of well-established systems, all using blasts of air, steam, or combustion gases to attenuate fine streams of molten glass into thread-like fibers having diameters ranging from three to one hundred, hundred thousands of an inch.

For textile purposes the fivers may be of continuous lengths or formed into strands from staple lengths varying between eight to sixteen inches. In the production of glass wool, from which mats, rolls, and tubular fibrous bodies are fabricated and to which this invention pertains, the fibers in lengths generally averaging less than eight inches are collected in a fleecy mass upon a conveyor moving across the bottom of a glass fiber forming hood. The glass must be of consistently uniform fiberizing properties to maintain the average in the proportions of fine and coarse fiber needed to have fines to achieve acceptable insulation values and coarser fibers to provide dimensional stability, strength and resilience. When it is desired to integrate the resultant fibrous mass a heat settable binder, such as phenol formaldehyde, is usually dispersed among the fibers as they are gathered on the conveyor. However, binder may be distributed in powder, film or other forms.

Such masses of fibrous glass have superior qualities for thermal insulation and sound absorption because of the minute conductive paths at contact points between the cylindrical fibers and the multitude of air cells between and thin air layers around the fine fibers.

A phenol formaldehyde resin binder polymerizes in a matter of seconds upon reaching the predetermined curing temperature. However, this binder is generally introduced in an aqueous solution and the removal of the water by vaporization consumes a great amount of heat and must precede the application of the final heat instrument which raises the basic resin constituent to the required curing temperature. Further, it has been found that in order to provide the substantially even distribution required in the production of tubular fibrous bodies a period must be provided after the introduction of the aqueous solution to allow the solution to migrate to all parts of the fibrous mass to evenly distribute the binder therein before it is removed by a suitable drying means. Drying means suitable for use in the apparatus and method of this invention may include the well-established and conventional hot air drying means or the more recent innovations in the dielectric heating field, or a combination of both.

Figure 1:
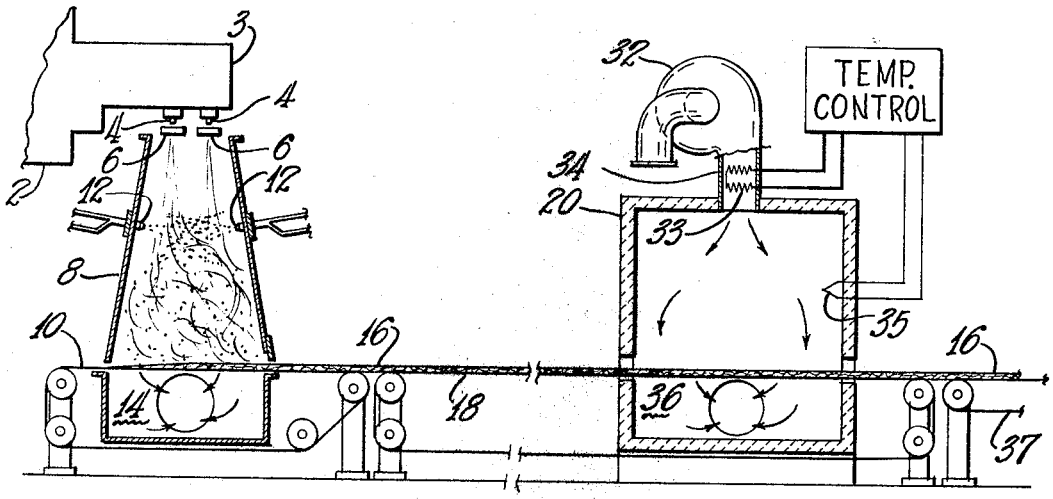
FIGURES 1 and 2 are schematic, elevational, sectional views of apparatus for carrying out the method set forth in this invention.

Referring to the drawings, the glass wool production equipment of FIGURE 1 begins with the glass melting tank 2, from the forehearth 3 of which, the molten glass flows in fine streams out orifices in bushings 4. The threads of glass are drawn downwardly and attenuated by air or steam jets from manifolds 6 into fibers, of a diameter suitable for the tubular fibrous bodies to be formed later.

As the fibers fall within the hood 8 toward the receiving conveyor 10, intermingled therewith are discrete particles of an uncured binding agent, preferably a phenol formaldehyde resin in an aqueous solution. The binder solution is projected among the falling fibers by air atomizing nozzles 12 extending through the walls of the hood 8. The glass fibers impregnated with the binder collect in a pack or mass upon the pervious, receiving conveyor 10, assisted by a suction chamber 14 into which air is drawn down through the conveyor.

The fibrous glass web, mass or pack 16 thus formed commonly has a width of four feet and a thickness ranging up to eight inches or more as controlled by the speed of the conveyor and the production rate of the fibers, the thickness being selected to fit the specifications of the final product.

The continuous pack 16 is advanced upon receiving conveyor 10 for delivery to the following foraminous or mesh type conveyor 18. The latter is a woven wire belt but may be an open weave fabric or perforated belting, for instance, of silicon rubber composition. The distance between the forming hood 8 and a drying oven or means 20 is set in conjunction with the speed of the conveyors 10 and 18 to provide a predetermined minimum amount of time for migration of the aqueous solution containing the heat settable binder to all parts of the mass for substantially even distribution of the binder. The drying oven or means 20 has connected thereto an air blower means 32 with a conduit 34 communicating with an aperture formed in the upper portion of the drying oven 20. Heating means 33, for example a plurality of electrical heating elements, may be distributed within the duct 34 and in conjunction with a temperature control and a thermostat 35 act to control the heat of the air coming from blower 32 to provide a drying effect for the length of the fibrous mass 16 passing through the oven 20. A suction chamber 36 may be situated below the foraminous conveyor 18 to draw the drying gases through the glass web or mass for more complete drying. The suction hood 36 may be connected to the blower 32 for recirculating the air from drying oven 20 to permit a savings in fuel or power for heating means 33.

Figure 2:
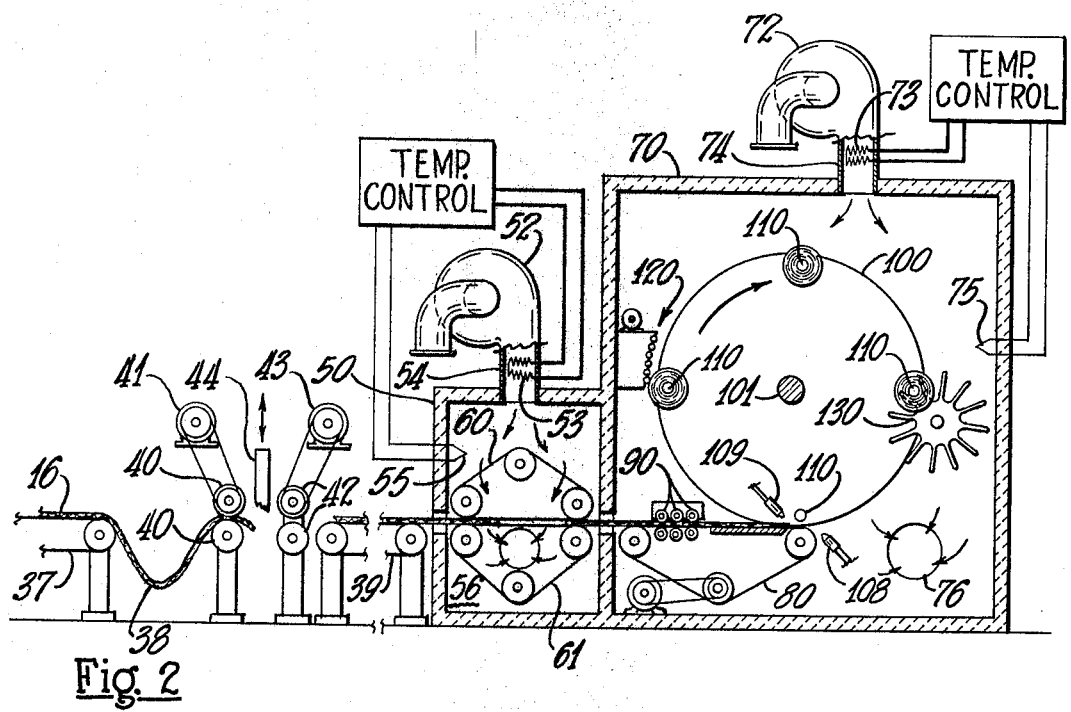

After leaving drying means 20 the length of fibrous material 16 is conveyed by conveying means 37 to a means for forming a plurality of pelts from the length, each pelt having feathered leading and trailing edges by parting the length transversely at predetermined intervals by the application of axially applied tension. In FIGURE 2 this tension is applied axially by sets of parting rolls 40, 42 powered by motors 41 and 43, respectively. Motors 43 may turn parting rolls 42 in a direction to advance a pelt or length continuously along conveyor means 39. Similarly, rolls 40 may be turned in a direction to advance the pelt or length to conveyor 39 except that at predetermined intervals motor means 41 is reversed to back up roll 40 and cause the parting of the length and to provide the feathered leading and trailing edges at the part. The back up may be collected in an accumulation loop 38 just prior to parting rolls 40. If necessary a sawtoothed element 44 may be pushed downwardly between parting rolls 40 and 42 to assist in the axial tearing and feathering of the pelt.

The pelt is conveyed along conveyor means 39 into a cure initiation oven means 50, where it is received, and compressed to a degree if desired, between opposing foraminous conveyor means 60 and 61. A blower means 52 may be connected via a duct 54 to the cure initiation oven 50. Heating means 53 may be placed in duct 54 and in conjunction with thermostat means 55 and a temperature control set the temperatures desired in the cure initiation oven 50. A suction chamber 56 may be utilized to draw the hot gases through the foraminous conveyors 60 and 61 to aid in a substantially even curing of the pelt as it passes through the cure initiation chamber 50. Suction chamber 56 may be connected with blower means 52 in order to recirculate the heated gases to conserve power or fuel.

The pelt is then conveyed to final curing oven 70. The final curing oven 70 has a blower means 72 communicating via duct 74 with an aperture formed in the oven 70. Heating means 73 are located in duct 74 and may cooperate with thermostat means 75 and a temperature control to control the heat level within final curing oven 70. A return suction means 76 may be connected to blower means 72 for recirculation of the heated gases. It should be noted that the two ovens 50 and 70 may be combined into a single oven, if substantially the same curing temperatures are to be utilized for initiation and final curing.

Located within the final curing oven 70 is a carrier means 100 having a plurality of mandrel means 110 carried thereon. A conveyor means 80 conveys the pelt to a pick up station where it may be wrapped around a rotating mandrel 110. Compacting rolls 90 may be located on both sides of a conveyor, if the conveyor is of the standard flexible belt type. If the conveyor is of the hard surface type to be described hereinafter, compacting rolls may be utilized only above the hard surface of the conveyor. Alternatively the compacting rolls 90 may be located to receive the pelt from the foraminous conveyors 60, 61 of the cure initiation oven, compact the pelt and deliver the pelt to a conveyor 80 for transportation to the pick up station. Means are provided, to be described hereinafter, for indexing the carrier means around to present a bare mandrel for picking up a successive pelt after a preceding pelt has been wound around a preceding mandrel. Further compacting and tubular body prestripping means 120 may be located at a prestripping station as shown in FIGURE 2.

Referring to FIGURE 3 there is illustrated in an enlarged view the method for advancing a pelt to and wrapping it around a mandrel 110. In the instance shown the conveyor means 80 is of the type having hard faced and braced plates 81 so that the conveyor itself may act as a back up and compacting means in connection with the wrapping of the pelt on the mandrel. A pelt 111 is advanced by conveyor means 80 until its feathered forward edge comes under a mandrel 110 rotating in the counterclockwise direction indicated by the arrow. In most instances the fibers in the feathered forward edge of the pelt 111 will wipe around the mandrel 110 to start the pelt 111 on the mandrel. However, an air nozzle or other air blast means 108 may be provided to assist both in wrapping the leading edge of the pelt 111 around the mandrel 110 and in cleaning any loose fibers from the surface of the conveyor 80. As a further aid in assisting the wrap-around action of the pelt 111 with respect to mandrel 110 an air blast nozzle or means 109 may be situated to tuck the feathered leading edge of the pelt 111 beneath a successive wrap of the pelt. The air blast means 108, 109 may operate continuously but may also be programmed to operate only during the initiation of a cycle.

Referring to FIGURES 4 and 5 there is illustrated the means for driving the carrier 100 and the mandrel means 110. A shaft 101 supports the carrier for rotation and may be journaled in pillow blocks 102 which are, in turn, supported by suitable framing. A pulley or gear means 103 may be secured to shaft 101 and driven by motor means 105 via a clutching and braking means 104. As also seen in the rear view of FIGURE 4 the mandrel means 110 may be journally supported in carrier 100 and have secured thereto gear means 112. The mandrel means 110 may be rotated via intermediate gears 113 driven by a main gear 114 journally supported on shaft 101. Main gear 114 may be driven via pulley or sprocket means 115 connected to driving or motor means 116 (FIGURE 5).

Referring to FIGURES 7 and 8 there is illustrated schematically and diagrammatically control means for indexing the carrier to the proper stations. It will be noted in the circuit diagram of FIGURE 8 that a numbered line diagram has been utilized. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and it's associated contacts is easily accomplished by noting in the righthand margin of FIGURE 8 the reference character of the actuating means, for example LSR, a limit switch relay, adjacent to line 10, the line in which contact actuating means LSR appear. Following the reference character there are noted the line numbers in which LSR contacts close when caused to due so by the actuating means, i.e. in line numbers 11 and 18. It will be noted that the line number 14 after the LSR is underlined. This indicates a back contact which opens whenever the actuating means is energized. Other actuating means and their associated contacts are similarly noted.

Referring again to FIGURE 7 it will be noted that a limit switch LS1 is located to be actuated by an extension 119 of each mandrel 110. Photocells PC1 and PC2 are situated along the conveyor 80 and detect the presence or absence of a pelt at that particular position along the conveyor 80. Thus, when a mandrel 110 has been indexed into position, limit switch LS1 has its contacts closed and limit switch relay LSR in line 10 of FIGURE 8 is energized. Back contact LSR in line 14 opens, opening the circuit to the fast indexing speed terminal of the carrier motor control located in lines 14 and 15. Front contact LSR closes in line 11 readying a circuit for energization of the relay PCR.

As a pelt advances photocell PC2 detects the presence of a pelt and closes contacts PC2 in line 17, but, since contacts CMSR are still open nothing happens. When the pelt is detected by photocell PC1, PC1 contacts close in line 16 energizing the carrier motor slow speed relay CMSR. CMSR contacts close in line 11 energizing photocell relay PCR through already closed contacts LSR. PCR contacts in line 12 then close providing a holding circuit around contacts LSR. CMSR contacts in line 15 close to energize the slow speed terminal of the carrier motor control in lines 14 and 15. The carrier motor control energizes motor 105 to move the carrier 100 at a slow speed through the distance or arc X, shown in FIGURE 3, while the mandrel is rotating and picking up the pelt. CMSR contacts also close in line 17 providing a holding circuit around PC1 contacts in line 16 via PC2 contacts.

In the meantime, the PCR contacts have closed in line 12 to energize the mandrel motor control and start mandrel motor 116 running, thereby driving the main gear 114, intermediate gears 113, and mandrel gears 112 to start all mandrels rotating. PCR back contacts have opened in line 14 to insure that the fast speed terminal of the carrier motor control remains deenergized during the pelt wrapping operation.

Thus the mandrel 110 is rotating to pick up the pelt 111 as the conveyor 80 conveys the pelt toward the pelt wrapping station. At the same time the carrier means 100 is slowly rotating on shaft 101 through the arc or distance X. This rotation is operative to lift the mandrel 110 away from the conveyor plates 81 to provide room for the pelt being wrapped on the mandrel 110. However, the progress of mandrel 110 away from the conveyor plates 81 is at a rate less than the pelt thickness as it builds on mandrel 110 thereby providing a compacting of the plt as it is wrapped onto the mandrel 110. It is to be noted that the mandrel 110 moves away from the plate 81 at a relatively low rate for the first portion of the sector or arc X, thereby causing the inner wraps of the pelt on the mandrel 110 to be considerably compacted to provide a hard inner surface for the tubular fibrous body being produced. The mandrel 110 then moves away during the latter part of the sector or arc X at an increasingly rapid rate thereby allowing the density of the intermediate portion of the tubular fibrous body to be less, increasing the insulating value. It should be noted that a standard compression roller may be used in conjunction with the mandrel to compact the pelt thereon.

The rotation of the carrier 100 is programmed to reach the end of arc or sector X before the remainder of the pelt is wound on mandrel 110. This allows the last few wraps to be compacted in a manner similar to the initial wraps providing a harder or more dense outer surface, and providing a calendering affect to the outer surface of tubular fibrous body. A limit switch comparable to the limit switch LS1 may be provided for detecting and ending the movement of the carrier means 100 when the distance denoted by the arc or sector X is completed. Alternatively, the PCR relay may be set to have a delayed drop out of its contacts. Thus, when PC2 detects the end of a pelt, PC2 contacts in line 17 open, deenergizing relay CMSR. Contacts CMSR open in line 15 stopping rotation of carrier 100, but PCR contacts stay closed for a predetermined period in line 13 to keep the mandrel rotating for compacting and calendering. Back contacts PCR in line 14 remain open to prevent the carrier 100 from indexing to the next position.

In the process of movement through the sector or arc X the limit switch LS1 has been deactivated thereby de-energizing the limit switch relay LSR. Contacts LSR in line 11 open, but to no effect since PCR contacts in line 12 still maintain the holding circuit. Back contacts LSR in line 14 close, but to no effect since back contacts PCR in line 14 are still open maintaining the fast speeed terminal of the carrier motor control deenergized. The PC1 contacts energized by photocell means PC1 are now open since the mat and the mandrel have moved past the position being monitored by photocell means PC1. Therefore, PC1 contacts in line 16 open, but to no effect since a holding circui is energized via CMSR contacts in line 17 and the still energized and closed contacts PC2.

As the last of the mat or pelt 111 is wound on mandrel 110 the photocell means PC2 is deenergized opening PC2 contacts in line 17. The CMSR relay in line 16 is thus deenergized opening contacts in line 17 to break its holding circuit, opening contacts in line 11 deenergizing the PCR relay (except for its delayed drop out as described above), and opening contacts in line 15 deenergizing the slow speed terminal of the carrier motor control. After a predetermined delay the PCR contacts in line 12 open breaking the holding circuit, PCR contacts in line 13 open deenergizing the mandrel motor conrol, and back contacts PCR in line 14 close energizing the fast speed terminal of the carrier motor control. Since the fast speed terminal is now energized the carrier 100 is indexed through the arc or sector Y to bring the next or successive mandrel 110 into pelt wrapping position.

At the same time the mandrel 110 bearing the newly formed ubular fibrous body has been indexed into a position for a prestripping operation. The prestripping station 120 may include rollers 121 driven by motor means 122 to rotate the tubular fibrous body in a clockwise direction, opposite that in which the mandrel 110 is operating. This breaks the tubular fibrous body free from the mandrel 110 and readies it for a stripping operation at a later station. The roller means 121 may be also used for further compacting and/or calendering of the exterior of the tubular fibrous body. With respect to time of operation, the body freezing and calendering station 120 is situated closely enough to a wrapping station so that the binder within the pelt 110 has not completed its final cure. This enables an easier freeing of the wrapped pelt 111 from the mandrel 110 without stressing the tubular fibrous body excessively. Further, if stress does cause exterior dents on the tubular fibrous body the calendering rolls 121 may again smooth the surface since the cure of the binder is not yet complete.

Referring to FIGURES 5 and 6 there is shown a means for stripping the completed tubular fibrous body from the mandrel 110. As each of the mandrels is indexed around they will be eventually indexed to a stripping station wherein the mandrel 110 will be indexed into position between fingers or yoke elements 131 of a stripping component 130. The stripping component or wheel 130 is secured to a shaft 132 (FIGURE 5) which extends through a wall of the curing oven 70 and is journaled in and supported by pillow blocks 141 mounted on a frame 140. The yoke members or fingers 131 are positioned so that they will follow the mandrel 110 throughout its movement through the distance or sector X to enable a stripping of the body before the carrier is again switched to a fast indexing speed. That is, the stripping wheel 130 rotates with the movement of the mandrel 110 as shown by the position of the mandrel 110 in dotted lines in FIGURE 6.

The frame 140 is supported for lateral movement parallel to the mandrel 110 by wheels 142 mounted to follow rails or tracks 143. Reversable motor means 144 via drive means 145 provides the power for the movement of the frame or cart 140. Referring to FIGURE 5, limit switches LS3 and LS4 determine the trip travel of the frame or cart 140 in pushing the tubular body 111 off of a mandrel 110. In FIGURE 8 it will be noted that the energization of the PCR relay by the indexing of the previous mandrel into pelt wrapping position closes contacts PCR in line 18 enabling energization of the yoke frame motor control. Since the frame will be in the rearmost position when the mandrel bearing a tubular body is indexed into engagement with yoke fingers 131, the limit switch LS3 will be closed. Therefore, the yoke frame motor control will energize motor 144 to drive the frame 140 forward, pushing the tubular body 111 off of the mandrel 110 as the carrier 100 is moving through the arc X. When the frame 140 reaches its most forward position the tubular fibrous body 111 will have been pushed off mandrel 110 into a suitable means, such as a chute where it may slide via a trap door onto a conveyor or other transit means for further handling. When this position is reached limit switch LS4 is activated, closing contacts LS4 in line 19 energizing the yoke frame motor control for a reverse drive of the motor 144. Back contacts LS4 and LS3 in lines 18 and 19, respectively, provide a failsafe means for insuring that the yoke frame motor control is energized to drive the motor 144 in only one direction at a time. Further, the limit switches LS3 and LS4 may be mechanically or electrically linked so that when one opens contacts, the other closes contacts. The speed of motor 144 is such that in connection with gearing to drive the cart 140, that one trip forward and back will be completed during the travel of the carrier 100 through the sector X.

When the cart 140 returns to its home position LS3 is closed enabling the yoke frame motor control to be ready to push the yoke fingers 131 in a forward direction again. However, the PCR contacts in line 18 will be open during the indexing of the carrier 100 through sector or arc Y, so the stripping yoke will not be energized.

There having been described preferred approaches to the method and apparatus described, it is apparent that, within the scope of the invention, modifications and different arrangements may be made other than is herein disclosed and the present disclosure is illustrative merely, the invention comprehending all variations thereof.

What I claim is:

1. A method of producing a tubular body of fibrous material comprising the steps of forming and collecting a length of a mass of glass fibers on a conveyor means as it moves past a fiber forming station, introducing a heat settable binder into said mass in an aqueous solution, allowing said aqueous solution to migrate throughout said mass to evenly distribute said binder in said mass, drying said mass to remove said aqueous solution therefrom while leaving said distributed binder in said mass, forming a plurality of pelts from said length having feathered leading and trailing edges by parting said length transversely at predetermined intervals by the application of axially applied tension, initiating a cure of said binder in a pelt, rotating a mandrel to roll said pelt thereon after initiation of the curing of said binder by the wiping action of the fibers in the feathered leading edge, winding the entire pelt on said mandrel to form a tubular fibrous body, rotating said body with respect to said mandrel before completion of cure of said binder, completing the cure of said binder, and stripping said body from said mandrel.

2. A method as defined in claim 1 which further includes the step of compacting the initial wraps of said pelt on said mandrel as said pelt is being wound on said mandrel to obtain a high density inner surface of said body to maintain dimensional control of the inside diameter of the tubular body, reducing the compaction of the intermediate wraps of said pelt on said mandrel to obtain a low density and a high insulating value for the intermediate wraps, and increasing the compacting of the final wraps of the pelt on the mandrel to obtain a high density and maintain dimensional control of the outer surface of the tubular body.

3. Apparatus for producing a tubular body of fibrous material comprising a station for forming and collecting a length of a mass of fibers, means for introducing a heat settable binder into said mass, means for forming a plurality of pelts from said length, means for initiating cure of said binder in a pelt, mandrel means adapted for rotation to receive said pelt thereon after the initiation of binder cure by the successive wrapping of the entire pelt thereon to form a tubular fibrous body, means for rotating said body with respect to said mandrel before completion of cure of the binder to free the body for stripping from the mandrel, means for completing the cure of said binder while said pelt is on said mandrel, and means for stripping the body from the mandrel.

4. Apparatus according to claim 3 which further includes means for compressing the initial wraps of said pelt on said mandrel as said pelt is being wound on said mandrel to obtain a high density inner surface of said body, means for reducing the compression of said compressing means on the intermediate wraps of the pelt on said mandrel to obtain a low density and a high insulating value for the intermediate wraps, and means for increasing the compression of said compressing means on the final wraps of the pelt on said mandrel to obtain a high density of the outer surface of the tubular body.

5. Apparatus for producing a tubular body of fibrous material comprising a station for forming and collecting a length of a mass of fibers, means for introducing a heat settable binder into said mass in an aqueous solution, means for drying said mass to remove said aqueous solution while leaving said binder therein, means for conveying said mass from said forming and collecting station to said drying means, said conveying means being run at a speed sufficiently slow to allow said aqueous solution to migrate throughout said mass to evenly distribute said binder in said mass before the mass reaches said drying means, means for forming a plurality of pelts from said length having feathered leading and trailing edges, means for initiating cure of said binder in a pelt, mandrel means adapted for rotation to receive said pelt thereon by the wiping action of the fibers in the feathered leading edge and the successive wrapping of the entire pelt thereon to form a tubular fibrous body, means for rotating said body with respect to said mandrel before completion of cure of the binder, means for completing the cure of said binder, means for stripping the body from the mandrel, and means for compacting said pelt on said mandrel as said pelt is being wound on said mandrel, said mandrel compacting means comprising conveyor means for conveying said pelt to said mandrel and means maintaining the distance between said mandrel and said conveyor means at an amount less than the thickness of the pelt on the mandrel.

6. Apparatus for producing a tubular body of fibrous material comprising a station for forming and collecting a length of a mass of fibers, means for introducing a heat settable binder into said mass in an aqueous solution, means for drying said mass to remove said aqueous solution while leaving said binder therein, means for conveying said mass from said forming and collecting station to said drying means, said conveying means being run at a speed sufficiently slow to allow said aqueous solution to migrate throughout said mass to evenly distribute said binder in said mass before the mass reaches said drying means, means for forming a plurality of pelts from said length having feathered leading and trailing edges, means for initiating cure of said binder in a pelt, mandrel means adapted for rotation to receive said pelt thereon by the wiping action of the fibers in the feathered leading edge and the successive wrapping of the entire pelt thereon to form a tubular fibrous body, means for rotating said body with respect to said mandrel before completion of cure of the binder, means for completing the cure of said binder, means for carrying a plurality of said mandrels and means for indexing a second mandrel into position to receive a second pelt after a first pelt is completely wound on a first mandrel.

7. Apparatus as defined in claim 6 which further includes means for conveying a pelt from said cure initiation means to said means for carrying said mandrels to enable the wrapping of the pelt on a mandrel, means for controlling the separation of a mandrel on its carrying means and said conveyor means to enable the application of pressure by said carrier and conveyor means to the initial wraps of the pelt to provide a high density inner surface of said tubular body, and means for increasing the separation of said mandrel and said conveyor means to reduce the compression on the intermediate wraps of said pelt on the mandrel to provide a low density and high insulating value for said intermediate wraps of said tubular body.

8. Apparatus as defined in claim 7 which further includes means for controlling the separation of said mandrel and conveyor means to compress the final wraps of said pelt on said mandrel to provide a high density outer surface of said tubular body.

9. Apparatus as defined in claim 6 in which said means for stripping said body from the mandrel comprises a yoke member, means for indexing a mandrel carrying a freed tubular body thereon from said body rotating means into registration with said yoke member, said yoke member being positioned to receive a portion of said mandrel between said tubular body and said mandrel carrying means, and means for urging said yoke member along the length of said mandrel to push the freed tubular body off the mandrel.

10. A method of producing a tubular body of fibrous material from a pelt of fibrous material having a binder distributed throughout said fibrous material comprising the steps of rotating a mandrel to wind said pelt thereon to form a tubular fibrous body, initiating the cure of the binder in said pelt, rotating said body with respect to said mandrel before completion of cure of said binder to prevent adherence of the binder to said mandrel, completing the cure of said binder, and stripping said body from the mandrel.

11. A method of producing a tubular body of fibrous material from a pelt of fibrous material having a binder distributed throughout the fibrous material comprising the steps of rotating a mandrel to wind said pelt thereon to form a tubular fibrous body compressing the initial wraps of the pelt on said mandrel to obtain a high density inner surface of said body to maintain dimensional control of the inside diameter of the tubular body, reducing the compression on the intermediate wraps of the pelt on said mandrel to obtain a low density and a high insulating value for the intermediate wraps, increasing the compression on the final wraps of the pelt on said mandrel to obtain a high density and maintain dimensional control of the outer surface of the tubular body, curing the binder in said pelt to maintain the densities obtained during the wrapping steps, rotating said body with respect to said mandrel before completion of cure of said binder to prevent adherence of the binder to said mandrel, completing the cure of said binder, and stripping said body from the mandrel.

12. A method of producing a tubular fibrous body from a pelt of fibrous material having a binder distributed throughout said pelt comprising the steps of wrappings the pelt around a mandrel, compressing the initial wraps of the pelt on said mandrel to obtain a high density inner surface of said body to maintain dimensional control of the inside diameter of the tubular body, reducing the compression on the intermediate wraps of the pelt on said mandrel to obtain a low density and a high insulating value for the intermediate warps, increasing the compression on the final wraps of the pelt on the mandrel to obtain a high density and maintain dimensional control of the outer surface of the tubular body, curing the binder in said pelt to maintain the densities obtained during the wrapping steps, and stripping the cured tubular body from the mandrel.

13. A method of producing a tubular fibrous body from a pelt of fibrous material having a binder distributed throughout said pelt comprising the steps of intiating a cure of all of the binder in said pelt, wrapping said pelt around a mandrel after the binder cure has been initiated, completing the cure of all of said binder as and after said pelt is wrapped on said mandrel, and stripping the resultant cured tubular body from said mandrel.

References Cited

UNITED STATES PATENTS

| 1,547,373 | 7/1925 | Ermold | 156—444 |
| 2,204,219 | 6/1940 | Jahne et al. | 156—444 XR |
| 2,505,045 | 4/1950 | Holcomb | 156—167 XR |
| 3,063,887 | 11/1962 | Labino | 156—184 XR |

HAROLD ANSHER, Primary Examiner

M. E. McCAMISH, Assistant Examiner

U.S. Cl. X.R.

156—215, 446